A. C. BROWN.
MEANS FOR SIGNALING OVER ELECTRIC LIGHT CIRCUITS OR POWER MAINS.
APPLICATION FILED SEPT. 25, 1913.

1,181,427.

Patented May 2, 1916.
4 SHEETS—SHEET 1.

WITNESSES
F. B. Townsend
Henry A. Gens

INVENTOR
Alfred Charles Brown.
BY
Townsend & Decker
ATTORNEYS

A. C. BROWN.
MEANS FOR SIGNALING OVER ELECTRIC LIGHT CIRCUITS OR POWER MAINS.
APPLICATION FILED SEPT. 25, 1913.

1,181,427.

Patented May 2, 1916.
4 SHEETS—SHEET 2.

WITNESSES:
F. B. Townsend
Henry A. Gens

INVENTOR
Alfred Charles Brown.
BY
Townsend & Decker
ATTORNEYS

A. C. BROWN.
MEANS FOR SIGNALING OVER ELECTRIC LIGHT CIRCUITS OR POWER MAINS.
APPLICATION FILED SEPT. 25, 1913.

1,181,427.

Patented May 2, 1916.
4 SHEETS—SHEET 3.

WITNESSES:
F. B. Townsend
Henry A. Gens

INVENTOR
Alfred Charles Brown.
BY
Townsend & Decker
ATTORNEYS

A. C. BROWN.
MEANS FOR SIGNALING OVER ELECTRIC LIGHT CIRCUITS OR POWER MAINS.
APPLICATION FILED SEPT. 25, 1913.

1,181,427.   Patented May 2, 1916.

UNITED STATES PATENT OFFICE.

ALFRED CHARLES BROWN, OF BLACKHEATH, LONDON, ENGLAND.

MEANS FOR SIGNALING OVER ELECTRIC LIGHT CIRCUITS OR POWER MAINS.

1,181,427.     Specification of Letters Patent.     Patented May 2, 1916.

Application filed September 25, 1913. Serial No. 791,715.

*To all whom it may concern:*

Be it known that I, ALFRED CHARLES BROWN, a subject of the King of Great Britain and Ireland, and a resident of Clarendon House, Granville Park, Blackheath, in the county of London and country of England, have invented certain new and useful Improvements in Means for Signaling Over Electric Light Circuits or Power Mains, of which the following is a specification.

The object of this invention is to provide for operating electric signals available for street or other fire alarms, ambulance calls, the synchronizing of clocks and other purposes, over ordinary electric lighting networks or power mains, or conductors which are also used for supplying electrical energy in the district or for tramways, and in such way as not to interfere with the ordinary operation of the said light or power mains nor to infringe any of the usual board of trade or similar regulations relating thereto, and so that the signals shall be efficiently transmitted and not interfered with by the power currents or the effect of occasional happenings such as load-switchings and the like on the mains.

I will first describe the system as applied to direct current mains.

At the transmitting stations any suitable controlling device may be employed, such for instance as a transmitter pendulum adapted to make and break a circuit in a definite rate in swinging in response to the operation of any suitable starting device, or else an automatic transmitter operating to make and break a circuit in code numbers or Morse beats on the actuation of a starting device, or alternatively or additionally a manually operatable key or switch, or the contacts of a relay. Either of the above devices I call the current integrator. In either case the circuit so made and broken operates to alternately connect and disconnect across the mains or between one or more of the conductors of the mains and earth, a buzzer or rapid make and break contact in series with a condenser or condensers, the condenser or condensers (which may have a little inductance in series therewith) being shunted by a resistance which may also be inductive, and of which shunt the electro-magnet coils operating the buzzer contact may form part where an electro-magnetic vibrator or buzzer is used, but the rapid makes and breaks may also be produced by other well known equivalents for instance by an electrolytic interrupter or by an intermittently quenched arc or spark gap. Or in some cases the integrator may simply connect and disconnect the shunted condenser with or without inductance to the mains once at each beat without a higher rate buzzer contact in series, and may also short-circuit the condenser while disconnected from the mains (the condenser then requiring no other shunt) or may reverse its pole connection to the mains at each beat. In either case the condenser charges quickly and with oscillations each time the circuit is closed and, when shunted, discharges ready to receive another charge during each short period of break, whether produced by the buzzer contact or by the integrator. The effect is therefore to set up and superimpose on the mains or network trains of small oscillatory currents at, and—if the buzzer contact be also used—through the period of—each of the makes of the integrating device, whether that be of the rated pendulum or clockwork code signaler form. These trains of small oscillatory currents which, as will be seen, are derived from the energy normally supplied to said mains for lighting or power have the property of traversing considerable lengths of the mains or areas of the network notwithstanding the very low combined resistance of the shunt formed by all the lamps, motors, dynamos, batteries, or other apparatus which may also be connected across the mains or network. I then cause these integrated trains of small oscillatory currents to affect certain receiving apparatus at the receiving station or stations—which may be situated anywhere in the district or town served by the same electric network or mains—as follows:—At a receiving station I connect across the same power mains or network, also in series with a condenser to stop direct current, an inertia contact oscillation selector relay which consists preferably of an electromagnet opposed to a diaphragm or reed having on it a contact surface on which impinges a small separately insulated counterbalanced weight or small contact piece held by a spring or pivoted lever and pressed on very gently so as to normally make light contact with the diaphragm or reed but to move off and thereby open or greatly increase the resistance of the contact by its own inertia on the passage through the electromagnet which is opposed to the diaphragm or reed of the above described trains of small oscillatory currents.

The contact between the diaphragm and weighted lever or spring controls or opens and closes or varies the resistance of, a local circuit at the receiving station, which circuit may derive energy either from a battery, or from a shunt off the power mains, through a proper resistance or retarding coil, and which local circuit also contains the coils of either a set of synchronized receiving pendulums adapted to be accumulated or swung up by current impulses in the rate of either of those respectively produced by the transmitters at the call points; or alternatively the local circuit may contain an ordinary relay energized by current which passes through or is affected by the diaphragm contact of the oscillation selector relay so that the ordinary relay is operated by the passage through the coils of the oscillation selector relay of the trains of oscillatory currents produced by a code signaling device at a transmitting station, and the tongue of which ordinary relay by controlling another local circuit thereby serves to operate in well understood ways either receiving pendulums or ordinary self-starting Morse or recording apparatus adapted to print or record a code signal indicating the address of the calling point or the particulars of a signal, or to perform other desired functions. This relay, or another controlled by it, may also have its movement slowed by means of a fluid dashpot or other device which gives a slow movement one way but quick the other, so as to cut out and prevent the recording of very short trains of oscillatory currents such as would be produced by momentary short-circuits or the like on the power mains. A bell or other call signal may also be operated at the receiving station or stations either on the accumulation of a harmonic pendulum receiver to a prescribed amplitude by the above described means, or by the closing of a relay also as above described.

The diaphragm mentioned in the buzzer selector relay as opposed to the electro-magnet may be replaced by a pivoted armature or by a spring reed, and which latter may for greater sensitiveness or for obtaining a greater range of selective numbers be tuned to the rate of the rapid makes and breaks of the vibrators at the call points. A reply signal may also be returned from a receiving station to a transmitting station by setting up at a receiving station a train or trains of oscillatory currents by means of generating apparatus similar to that described above for use at the transmitting stations, and which currents flowing also over the same network or power mains may make themselves apparent at the transmitting station on a telephone or its equivalent (with a condenser also in series) placed there conveniently to be heard by the operator, and which telephone may have a cone mouthpiece to augment the sound. Call bells at firemen's apartments may thus be operated, and selectively if desired.

Where the maximum load on the mains is liable to be heavy I may increase the distance to which the impulses will travel, by working between the power mains and earth, instead of across the mains, but still retaining the insulation of the mains from earth intact by interposing a condenser between the mains and earth, both at the transmitting and receiving stations, in series with the apparatus thereat, so as not to produce any actual earth connection at any point. For this purpose therefore, where the combination of a buzzer or rapid make and break contact in series with a condenser is used at a transmitting station for generating the impulses, I connect the opposite coating of the condenser to that which is connected to the buzzer contact, to earth, instead of to the opposite main to that to which the contact is connected, so that the current to generate the impulses is obtained directly across the mains but the oscillatory impulses themselves arising from the rapid chargings and dischargings of the condenser operate between the mains and the earth, and consequently have the power of traversing much longer distances, being less short-circuited, there being always a little resistance in the earth circuit both at the power station and when applied accidentally elsewhere. In some cases, as where it is customary to sometimes reverse the earth connection from one main to another at the power station and to meet other conditions, the receiving apparatus may be joined between earth and a third or middle insulated coating of a condenser the two outer coatings of which are joined one to each of the power mains; or equivalently the receiving apparatus may be joined between earth and the junction of two condensers in series, the opposite coating of each condenser being joined one to each of the power mains. Or instead of being joined between earth and the middle coating or coatings of a condenser or condensers, the receiving apparatus may have duplicate coils placed one in each of the two roads or circuits connecting the outers of the condenser or condensers with their respective power mains, the middle coating or the junction of the two condensers in series being earthed.

For alternating current systems I may use substantially the same arrangements as described above for working with direct current or I may then place the coils of the vibration selector relay as the cross or galvanometer circuit in a bridge combination, one arm of which bridge ratio has rather more inductance than the other, but the resistances of which are nearly balanced; or else wind the coil or coils of the selector relay differentially and join the respective halves oppositely—so as to tend to neutralize one another—and the half coils being in series with resistances one of which has somewhat more inductance than the other, so that in either case the effects of the ordinary alternations produced by the generator are largely reduced but the more rapid oscillatory currents produced by the signaling apparatus—being sharper waves—feel the effect or impedance of the inductances to a greater extent and therefore continue to affect the selector. Where a shunt from a power circuit is used to energize the receiving pendulum or recording apparatus also it is desirable in alternating current working to insert an electric valve or rectifier, such as either the electrolytic cell or lamp form, or one of the synchronous mechanical contact-reversing forms, which are now articles of commerce.

For alternating currents also the transmitting condenser or condensers need not necessarily be shunted—although they will still so work effectively—as the makes and breaks of the rapid vibrator or of the integrator find the circuit usually at different potentials at each stroke.

For either current system it is sometimes convenient to constitute the power or current generating station or any station into which a number of mains converge, an exchange or retransmitting station to receive the signals or trains of oscillatory currents in first instance from the transmitting stations and retransmit them on to the receiving station, and this may be done either automatically by the closing of relays operated by apparatus acting by means of oscillatory currents received over the mains in the above described manner, or manually, and the connection from the power station to the receiving station may be over mains in the same way, or by means of a special wire, and similar repeating sets may be arranged to retransmit through from one network or sub-station to another without making a direct connection across the networks. Or a small transformer or a pair of inductively opposed coils or a condenser capacity between the two networks may be applied at junctions of networks to transmit the impulses directly from one to the other.

From the above description of my method of transmitting and receiving electrical signals or mechanism-controlling impulses over electric light or power mains it will be apparent and well understood from the general state of knowledge how the same system can be applied to operate other apparatus under the control of the same current impulses.

In the accompanying drawings

Figure 1:
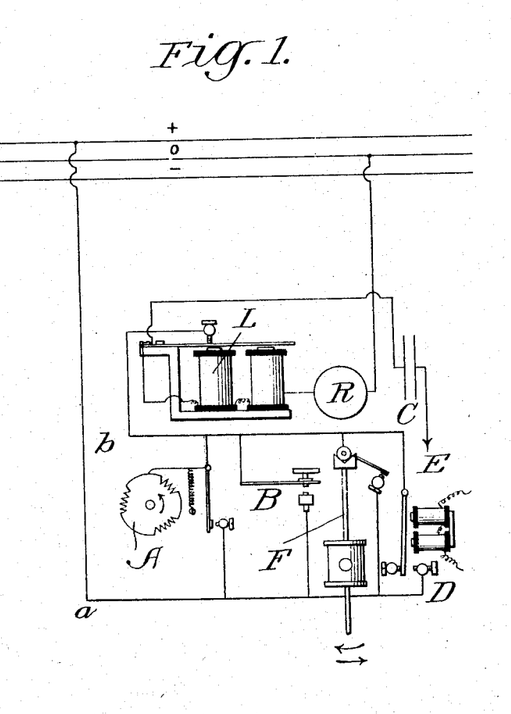
Figure 1 is a diagram of a transmitting set embodying my invention.
Figure 2:
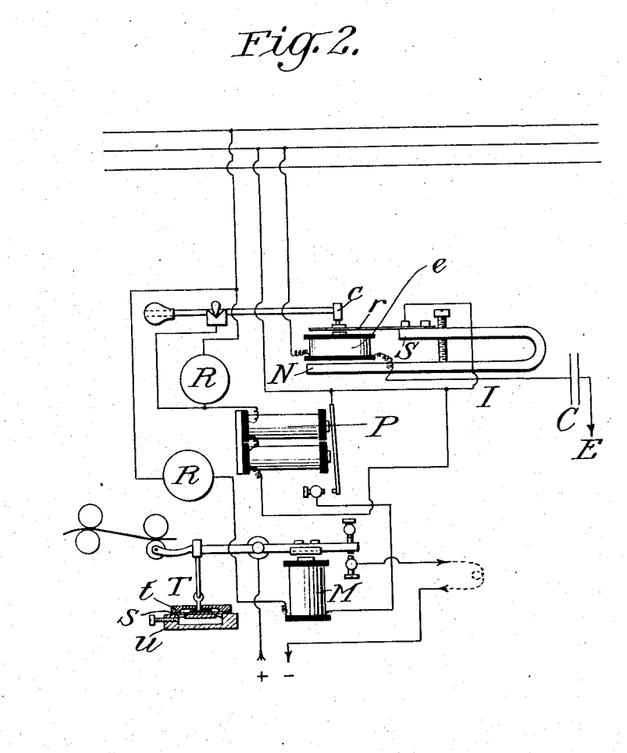
Fig. 2 is a diagram of a receiving set embodying my invention and adapted for use in conjunction with the transmitting set shown in Fig. 1.
Figure 3:
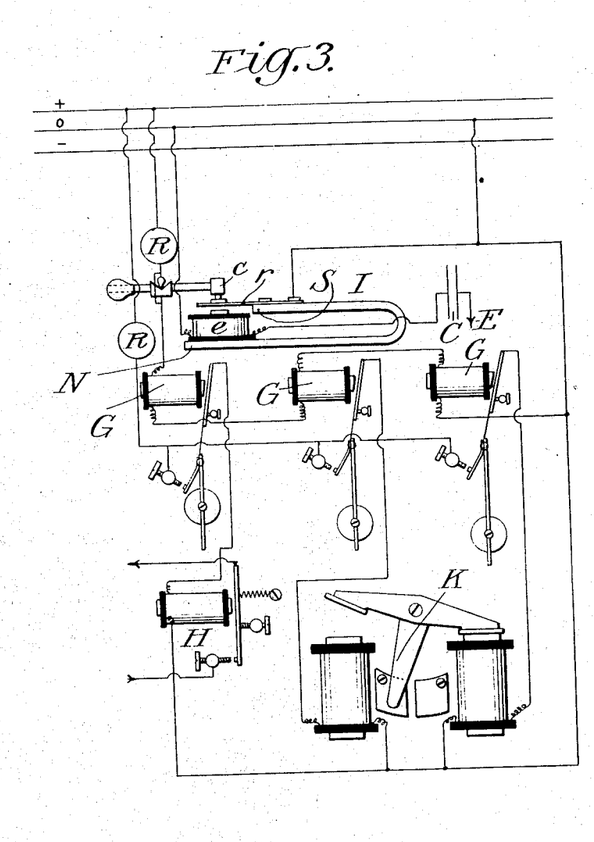
Fig. 3 shows a modification in the receiving apparatus employed in the receiving set.

In the drawings the three lines running through Figs. 1, 2 and 3 and marked +, —, and 0 represent the three wires, positive, negative, and neutral, respectively, forming an ordinary three-wire electric lighting or power system or network, the neutral of which is usually earthed at the power station through a small resistance or impedance.

Figure 11:
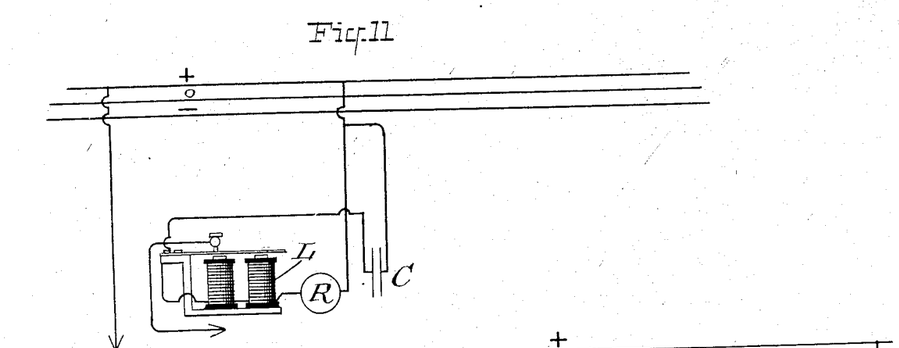
Figs. 11 and 12 illustrate modifications in the manner of connecting the condenser to the system.
Figures 12, 15:
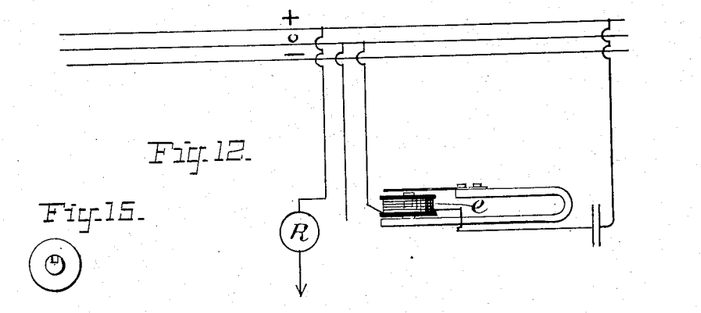
Fig. 15 is a cross-section through the same.

Fig. 1 is a diagram representing a transmitting set for producing the small oscillatory currents to be superimposed on the ordinary current in the mains according to the present invention. The transmitting device is controlled as to duration of the production of the oscillatory currents by a current-integrating device, four optional alternative forms of which are indicated in Fig. 1, viz: a code signaler or automatic transmitter A for sending specific numbers of beats or dots and dashes; on the starting of its driving mechanism; a manual key or switch B; a transmitter pendulum F, and a relay D for operating the transmitting set in beats controlled by currents sent from a distance. While all of these optional forms of current integrator may be used at a station it is obvious that only one of them would usually be required, the selection depending on the particular purpose for which the transmission is intended. Thus for fire alarm purposes the code signaler A or the pendulum F is usually employed. For actuating switches at a distance by oscillatory currents sent over the mains the hand key or switch B, the relay D or the pendulum transmitter F would be used according to circumstances. The mechanism for rotating the code signaler wheel A and the details of the transmitter pendulum F are not shown, as such are existing articles of commerce and are not claimed, and the transmitter pendulum may also be started and stopped directly by hand or through the medium of any suitable levers or by any movement-maintaining mechanism. In either case whichever current integrating device is used to inaugurate and control the duration of the production of the small oscillatory currents to be superimposed on the mains, the production of the said oscillatory currents is brought about by the rest of the transmitting device as follows: On the closing of the circuit between the points $a$ and $b$ by one or other of the current integrating devices, current is taken from a live wire of the mains (which may be either positive or negative according to the side of the three-wire system, if such be used, which is the more accessible at the particular station) via wires $a$ and $b$ to the back contact stud of an electro-magnetic buzzer or rapid make and break L. From the vibrating blade of the buzzer, which when at rest is normally in contact with this stud, the current goes on through the coils of the buzzer and having in circuit an added resistance if necessary to reduce the amount of current, (lettered R in every case in these drawings) to the neutral main or a wire of different potential. A condenser C is also connected between the blade of the buzzer and earth, when the main line is as usual earthed at the power station, or if the neutral be not earthed then said condenser would be joined between the blade of the buzzer and one of the mains, so as to bridge the coils and resistance. Either connection is operable provided that it bridges a pair of wires or portions of the system of different potential but the preferable manner of connection is shown in Fig. 1. The modification wherein the condenser is connected between the blade of the buzzer and another main is illustrated in Fig. 11, which is self-explanatory. On the operation of the buzzer in the beats or intervals produced by the particular current integrating device employed, rapid chargings and dischargings of the condenser take place which produce small oscillatory currents and these traverse the mains or the circuit formed by one of the mains or all the conductors of the main together and earth; the insulating plates of the condenser or condensers preventing the flow of continuous current over the same circuit or only allowing a small flow if the ordinary current is alternating at normal frequencies. These oscillatory currents affect one or other of the receiving devices shown in Figs. 2 or 3. Considering first Fig. 2 which represents a receiving set suitable for fire alarm calls or ordinary signaling, the oscillatory currents from one of the mains pass over a circuit comprising the inertia contact vibrating relay I, the condenser C (of a capacity preferably from about 2 to 5 microfarads) to earth, or to another wire of the mains. The latter modification in the manner of connection of the condenser is shown in Fig. 12, which is self-explanatory. It may be here stated that when working between the mains and earth it is found that it does not make the least difference to which wire of the three (where a three-wire system is used) the relay and condenser circuit to earth is connected (excepting for the extraneous oscillations or "sing" mentioned farther on) or whether on the same or opposite side of the three-wire system to the transmitting set, as all three wires appear to transmit the oscillatory currents equally, being practically all short-circuited together for signaling purposes by the multitude of lamps and other appliances connected across them and forming the ordinary load.

Where as is frequently the case the neutral is earthed at the power station through a small resistance however, the ordinary "sing" or current vibration produced by the dynamo commutators is less in the neuter, and I therefore usually prefer to join the relay and condenser, between the neuter and earth.

Figure 13:
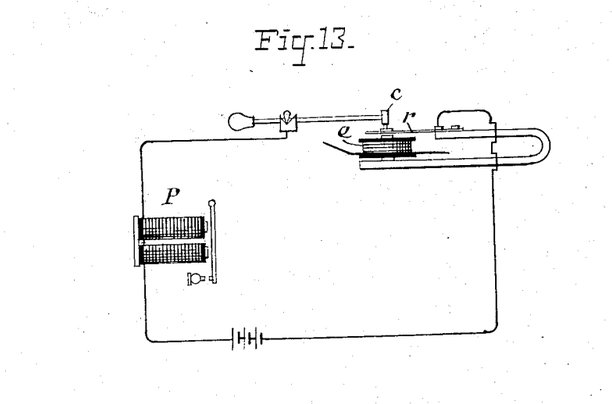
Fig. 13 is a modification in the manner of operating the local receiving magnet from the inertia relay.

The relay is composed of an electro-magnet $e$ attached to a polarizing magnet N. S. and oposed to a steel or iron reed $r$ also polarized by the magnet. Pressing lightly on the back of the reed $r$ is a small inertia contact piece $c$ carried by a nearly counterbalanced lever working on knife edges (or which inertia piece may be suspended in any other suitable manner) and normally making light contact by means of carbon, platinum, iridium or other suitable contact surfaces with the reed, but being otherwise insulated at its supports therefrom. A constant current is put through this contact either from a battery, or, as shown, from across the power mains through a suitable resistance, (lettered R in the drawings) and the circuit also includes an ordinary relay P which may be either of polarized or non-polarized form, the latter being shown. The coils of this ordinary relay are placed preferably in shunt relation to the contacts of the vibration relay I so that these coils are normally short-circuited thereby, but they are unshort-circuited, and the ordinary relay therefore brought into action, on the passage through the coils of the vibration relay of the rapid oscillatory currents arriving over the mains. Or the ordinary relay may be in series instead of parallel with the inertia contacts of the vibration relay as indicated in Fig. 13, so that its coils are normally energized but are deënergized by the breaking of its circuit by the inertia contacts, the opposite movement of the armature of the ordinary relay being then utilized to affect its local contacts, the local circuit being then preferably completed by the movement of the armature on release on to its back stop. Or the ordinary relay may be joined in any other manner so that its movement is controlled by the separation of the inertia contacts of the vibration relay in response to oscillatory currents passing through the latter's coils.

In either case the local contacts of the ordinary relay can then be utilized in well understood ways to control other circuits and operate any apparatus which can by usual methods be applied thereto, as for instance a Morse printing telegraph as indicated in the diagram at M, and any amount of power required to operate other apparatus can be controlled by more powerful relays operated by the first or lighter one, as is indicated in the diagram by the Morse arm being shown as controlling another circuit.

T in Fig. 2 represents the pneumatic slowing device mentioned for preventing the Morse arm, or a relay arm, from working in response to very rapid pulsations, but allowing it to move with certainty in response to slow or continued trains of pulsations. This consists of a disk of oiled silk or other flexible impervious material stretched on and cemented or otherwise attached to a ring $t$, like a small drum head, and suspended by a central attaching washer and rod to the Morse arm or relay arm as shown, so as to be lifted by the arm on its movement. This membrane being dropped over a cavity in the flat plate or seating $u$ attached to the framework exerts great resistance to a sudden rise or movement, on account of its vacuum or air sucker action, but yields easily to a slow movement.

Figure 14:
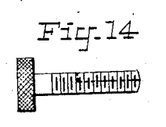
Fig. 14 shows in enlarged side view the screw for adjusting an air opening in the pneumatic slowing device as hereinafter described.

The back movement of the arm is rapid as the air can easily escape, but on the forward movement of the arm the air is prevented by the sucker action from quickly entering, the rising movement of the drum or sucker being therefore slow but the downward movement quick because in the latter case the air easily escapes around the edges. The time rate of the rise can be approximately adjusted by opening or closing a small aperture communicating from the outer air to the central recess over which the membrane drops, as, conveniently, by screwing a slotted screw more or less into a hole drilled through the side of the seating block into the central recess. The slot is a thin slot cut down the thread so as to give the passing air more or less resistance as the screw is adjusted in or out. This slot is indicated by the dotted line in the enlarged side view of the screw Fig. 14 and is shown in the cross-section Fig. 15. This slowing device is optional and need only be used where it is desired to cut out extraneous oscillations occurring on the circuit, and any other arrangement which will accomplish the same object may be used in its place.

Figures 4, 5, 7, 8:
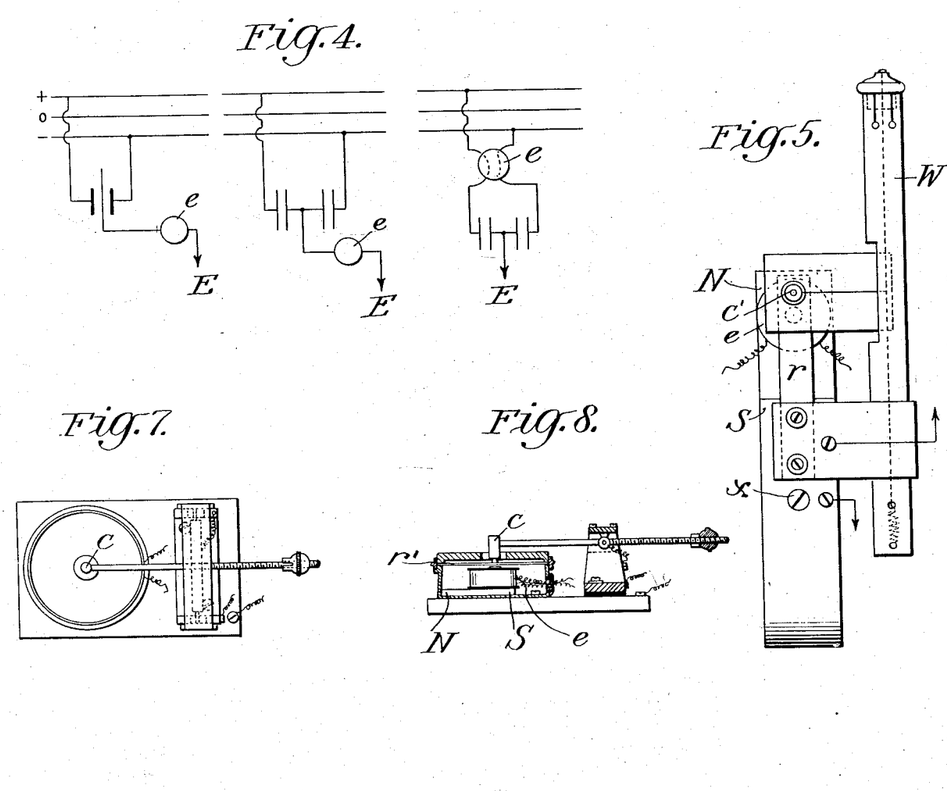
Fig. 4 shows modifications in the manner of connecting the receiving relay coils and condenser or condensers to the lighting network or power mains.
Figs. 5 and 6 are respectively front and side elevations of a special form of receiving relay especially adapted for use in my improved system.
Figs. 7 and 8 show respectively a plan and section of a modified form of relay adapted for use in the receiving set.

Fig. 3 is a diagram of a receiving set adapted to enable the rapid oscillatory currents produced in and running over the electric mains to operate isochronous receiving pendulums and thereby to pick out distinctive signals or sets of currents, and perform a variety of functions which may be desired, according to the particular rated beats or pulse intervals of the sets of oscillatory currents sent. In this set the primary movement initiating device is as before an electro-magnetic inertia relay I of similar kind to that described with reference to Fig. 2, and, as with the latter, either a diaphragm or a spring reed may be used as the vibrating member—the latter is shown. Where the reed is used however in either case an increased sensitiveness may be secured by tuning the rate of the reed to resonate with the individual makes and breaks of the buzzer in the transmitting set, but I do not find this refinement necessary. The coils $e$ of the primary relay with a condenser or condensers C in series, are, as in the Fig. 2 set, joined either across the mains as shown in Fig. 12 or across from one or more of the mains to earth, separate condensers or condenser plates or surfaces being of course used for each main if more than one main is utilized in conjunction with earth as shown in Fig. 4. The inertia contacts $c$ of this relay are then used to close and open, or vary the resistance of another circuit in response to the oscillatory currents passing through its coils.

The second circuit so varied comprises in this case a source of electric energy, which may be obtained from the same mains as shown, or from any other desired source, and the coils of one or more sets of electro-magnetic isochronous receiving pendulums as indicated at G and which pendulums, together with the transmitter pendulum F mentioned in reference to Fig. 1, may be of the gravity or spring controlled forms described in present applicant's and another's prior British patent specifications Nos. 2020 of 1883, and 7773 of 1884, which are those shown in this diagram or any other suitable form may be used which will effectually respond to currents sent at their distinctive rates, but firmly resist movement in response to currents attempting to affect them in any other rate. The oscillatory currents in the mains are thus caused to selectively accumulate the motion of one or more of the receiving pendulums or simultaneously any number of multiples thereof of similar rate, at either the same or different stations on the mains, and the receiving pendulums on accumulating to a certain amplitude are utilized to operate contacts in another circuit and thereby to produce almost any mechanical effect which may be desired. In some cases the accumulating movement of the receiving pendulums themselves may be sufficient to directly produce the results required, or a heavier relay or train of relays controlled by the pendulums can be operated so as to augment the power to any required extent for moving heavy mechanism. A typical variety of these applications is shown in the figure. Thus H shows an ordinary relay adapted to be operated by a receiving pendulum accumulated under the control of the vibrating inertia contact relay governed by oscillatory currents over the mains. The ordinary relay may then of course be used selectively for many purposes as to ring bells, give indicator signals or move switches and the like or to actuate the synchronizing mechanism of clocks, and generally to operate any mechanism the movement of which can be initiated by an electro-magnet; and it can be depended upon to only operate in response to successive trains or beats of oscillatory currents sent at the pre-determined rate. K represents a double electro-magnetic switch arranged to be moved one way by currents controlled by the accumulation of a pendulum of a certain rate, and the reverse way by a pendulum of another rate, so that by sending beats of oscillatory currents over the mains in either one or the other of these rates the switch can from a distance be moved either one way or the other as desired. Almost any number of multiples of such sets placed at various points on the mains can also simultaneously be operated by the same rate impulses and other similar sets having different rate pendulums can be operated selectively by other rates of impulses. Arc or incandescent street lamps can thus be switched on and off from a distance and many other useful operations performed.

The details of the ordinary relays, switches and accessory apparatus mentioned above are not claimed and are therefore outlined only in the drawings to show the application to them of the method of working according to this invention. The receiving sets herein described may be operated by oscillatory currents produced or controlled as to rate of pulse by other means than the transmitting sets mentioned, or the transmitting sets herein described may be used to operate other relays and receiving sets.

In Fig. 1 the condenser is shown as joined across from the spring constituting the vibrating blade of the buzzer and making contact with a contact stud as already described, which, while the contact is closed, communicates with a live line or an unearthed wire of the mains.

The connections shown as going to the + or − and neuter wires might be reversed.

Fig. 4 shows three alternative methods of connecting the receiving relay coils and condensers between two live mains and earth. In this case either a third plate in the condensers connected to earth is used, or the equivalent of two condensers in series with the middle connection earthed, as mentioned above in this specification; e represents in each case the electro-magnet coils of the vibration relay, and the last one is shown as double wound to fit the two condenser circuits. These methods of connection are sometimes useful for alternating current working, and to reduce the noise or effect of ordinary currents in the mains on the receiving relay.

Figs. 7 and 8 show plan and section of a diaphragm form of inertia contact relay for optional use in the set shown in the diagrams Figs. 2 and 3. In Figs. 7 and 8 the same letters apply to the parts as in Figs. 2 and 3, excepting that r' here represents the diaphragm instead of a reed for the vibrating member. The details of this relay and of the others shown may be varied, the essentials being an electro-magnet opposed to a vibrating member and a small inertia contact piece pressing lightly on the vibrating member.

Figure 6:
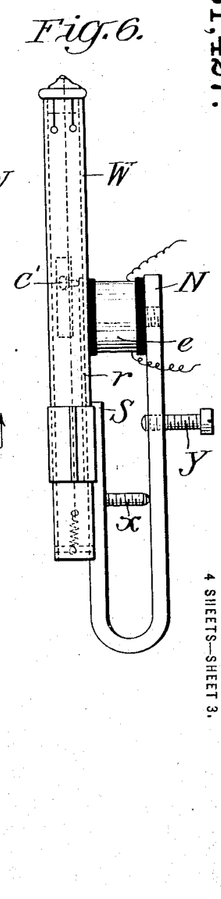

Figs. 5 and 6 respectively show front and side elevations of a special form of the primary inertia contact oscillation receiving relay for use in place of I in Figs. 2 or 3, and which I prefer to use to obtain greater sensitiveness for cases where one of the mains is connected to earth at the power station either directly or through a very low resistance. In this relay the light pressure is put on the inertia contact by means of a frictionless torsion wire.

In these figures as well as in regard to the forms of relays shown in Figs. 2, 3, 5 and 6 N. S. is the permanent magnet, e the electromagnet (preferably wound to a low resistance) r the vibrating reed or spring attached to the opposite pole of the permanent magnet and polarized thereby, w is a tube fixed by insulating supports to the permanent magnet and carrying a fine torsion wire, suspended or stretched between a rotatable washer closing the top of the tube and a spiral spring attached to the tube inside the other end, and arranged to keep the torsion wire under tension.

Attached to the wire near the middle is a light arm or flap, which may be of mica or metal, carrying the small inertia contact piece $c'$ which is in any case electrically connected across to the torsion wire and through this to the tube. This inertia piece normally makes contact by means of carbon, platinum, iridium or other contact surfaces, with the vibrating spring or reed $r$, on to which it is very lightly pressed by the torsion of the wire, and which pressure can be accurately adjusted by rotating the washer closing the top of the tube, which is split so as to make the washer friction-tight, as shown, and to the center of which washer the torsion wire is soldered or otherwise attached. Wires from the attaching piece which carries the tube and from the permanent magnet which carries the vibrating spring respectively, therefore form the two sides or connections from the inertia contact and replace those from the similar contacts of the relays I shown in Figs. 2 or 3 whose place this relay takes.

The arm or lever carrying the inertia contact is made preferably in the form of a wire or rod, as the damping effect of the air vane action to small but rapid oscillations is found to materially improve the stability of the inertia contact, and to considerably sharpen or accentuate the signals or possible speed of making variations in the circuit controlled by the relay contacts. Instead of the torsion wire any other suitable mechanical means for suspending and giving a bias to the inertia contact piece may be used. The torsion wire suspension has however the advantage of being frictionless, and of making sure of the connection to the inertia contact piece.

$x$ is a screw which by slightly increasing the distance apart of the limbs of the permanent magnet serves to accurately adjust the distance of the reed from the pole of the electro-magnet.

$y$ is a screw for attaching the relay to a vertical board or framework. This relay may also be useful for other purposes, as for translating or magnifying the signals received in wireless telegraphy, or (if then preferably made with carbon instead of metallic contacts) for a telephone relay, and other similar purposes.

By the term "another portion of the system at a different potential" herein used, I mean either a connection to earth or a connection to another wire or conductor of the system.

Figure 9:
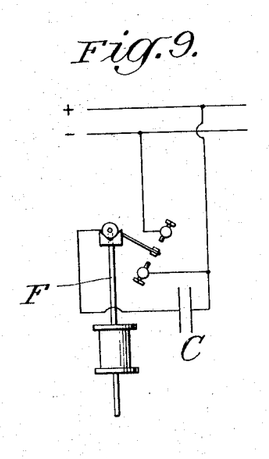
Fig. 9 illustrates diagrammatically an arrangement of circuits whereby the integrator may short-circuit the condenser while disconnected from the mains.

Fig. 9, which is self-explanatory, shows the manner of connecting up the transmitting pendulum integrator to the condenser and the mains, so that the condenser will be short-circuited by the integrator at each complete double swing thereof, the condenser being at such time disconnected from the mains (the condenser then requiring no other shunt).

Figure 10:
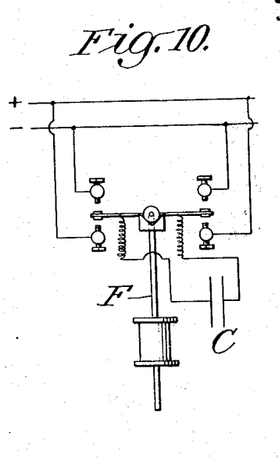
Fig. 10 illustrates an arrangement of circuits whereby the integrator may reverse the pole connections of the condenser to the mains.

Fig. 10, which is also self-explanatory, shows how the integrator pendulum may reverse the connection of the poles of the condenser to the mains at each beat by means of pole-changing contacts working in conjunction with a swinging arm operated by the integrator.

Having now particularly described and ascertained the nature of my said invention, and in what manner the same is to be performed, I declare that what I claim is:—

1. The combination with an electric supply net-work or set of mains, of means for generating from and superimposing on the ordinary current of said mains small oscillatory currents capable of traversing the said net-work notwithstanding the ordinary load, and means responsive to said currents and connected to said mains or net-work in series with a condenser, the other side of which condenser is joined to another portion of the system at a different potential.

2. The combination with an electric supply net-work or set of mains, of means for generating from and superimposing on the ordinary current of said mains small oscillatory currents capable of traversing the said net-work notwithstanding the ordinary load, and an inertia contact oscillation selector relay having an electro magnet connected to one conductor of the said power mains or net-work and in series with a condenser, the other side of which condenser is connected to another portion of the system at a different potential.

3. The combination with an electric supply net-work or set of mains, of means for generating from the ordinary current of said mains and superimposing rapid oscillatory currents on said net-work or mains and capable of traversing the whole net-work notwithstanding the ordinary load, said means comprising a make and break contact device one side of which is joined to one conductor of the mains while the second side is joined through a condenser and also through a resistance to another portion of the system at a different potential as and for the purpose described.

4. The combination with an electric supply net-work or set of mains, of means for generating and superimposing upon said system of mains or net-work rapid oscillatory currents derived from the electric energy normally supplied to said mains and capable of traversing the whole net-work notwithstanding the ordinary load, said means comprising a rapid make and break device one side of which is joined to one conductor of the mains while the second side is joined to a condenser and also through a resistance to another wire of the main at a different potential and means connected to a wire of the mains and responsive to said oscillatory currents.

5. The combination with an electric supply network or set of mains used for the purpose of supplying electrical energy for lighting or power of an automatic transmitter or coding device for imparting a distinguishable characteristic or distinctive number of beats to groups of oscillatory currents to be generated and transmitted over the said mains, and a device consisting of a buzzer and condenser as herein described connected to said mains for producing such oscillatory currents from and superimposing them on the ordinary current of the said mains, and means connected to said mains for receiving and translating the groups of oscillatory currents generated and transmitted over the mains.

6. The combination with an electric supply network or set of mains used for the purpose of supplying electrical energy for lighting or power, of transmitting apparatus for superimposing on said mains periodic oscillatory currents, derived from the electric energy normally supplied to said mains and an inertia contact relay in series with a condenser for receiving and translating sets of oscillatory currents arriving over the said mains so as to operate signals or other mechanism at a distance from the station transmitting the oscillations, as herein described.

7. The combination with an electric supply net-work or set of mains used for the purpose of supplying electric energy for lighting or power, of means for generating oscillations in electric energy derived from said mains and transmitting said oscillations over said mains and oscillatory current receiving devices connected between a conductor of the supply mains and another portion of the system at a different potential, combined with a condenser interposed in the circuit connections of said receiving devices, as herein described.

8. The combination with an electric supply net-work or set of mains used for the purpose of supplying electric energy for lighting or power, of transmitting devices for generating and transmitting over the mains groups of oscillatory currents and in distinctive number of beats and a vibration relay connected to said mains for receiving and translating the oscillatory currents, said relay having a torsion balance arm carrying an inertia contact piece and pressing lightly on to the vibrating member of the relay, the pressure on the contacts being adjustable by rotating the torsion wire, as described.

9. The combination with an electric supply net-work or set of mains used for the purpose of supplying electric energy for lighting or power, of means for generating and transmitting over the mains oscillatory currents derived from said mains in distinctive number of beats or groups, a relay connected to said mains for receiving the said oscillatory currents and provided with an inertia contact and an air-vane damper applied to said contact as and for the purpose described.

10. The combination with an electric supply network or set of mains of a set of apparatus capable of generating small oscillatory currents from the electric energy normally supplied to said mains and of superimposing them on the ordinary current in the said mains, an inertia contact relay for receiving the oscillatory currents, and means controlled by said relay for receiving signals, as and for the purposes described above and illustrated in accompanying drawings.

11. The combination of a set of electric light light or power mains, means for generating rapid oscillatory currents capable of traversing the said mains and adapted to be superimposed upon the ordinary power current in the said mains, said means comprising a buzzer or rapid electro-magnetic make and break connected to the mains and taking current therefrom and a condenser joined across the coils of said buzzer and in series with the contacts, means for breaking the said oscillatory currents into beats or pulses of determinate duration, an inertia relay responsive to such currents for receiving the beats or pulses and means controlled by said inertia relay for translating the said beats or pulses into definite signals as and for the purpose described.

Signed at 7 Finsbury avenue Queens Square in the county of London and country of England this seventeenth day of September A. D. 1913.

ALFRED CHARLES BROWN.

Witnesses:
W. MAXWELL,
R. J. SEWELL.